(12) United States Patent
Tanaka et al.

(10) Patent No.: US 8,691,461 B2
(45) Date of Patent: Apr. 8, 2014

(54) FUEL CELL SYSTEM

(75) Inventors: Hiromi Tanaka, Toyota (JP); Yoshiaki Naganuma, Toyota (JP); Osamu Yumita, Seto (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 175 days.

(21) Appl. No.: 13/390,005

(22) PCT Filed: Aug. 21, 2009

(86) PCT No.: PCT/JP2009/064613
§ 371 (c)(1),
(2), (4) Date: Feb. 10, 2012

(87) PCT Pub. No.: WO2011/021301
PCT Pub. Date: Feb. 24, 2011

(65) Prior Publication Data
US 2012/0141898 A1 Jun. 7, 2012

(51) Int. Cl.
*H01M 8/04* (2006.01)
(52) U.S. Cl.
USPC .......................................... 429/432; 429/429
(58) Field of Classification Search
USPC ................................................ 429/428–432
See application file for complete search history.

(56) References Cited

U.S. PATENT DOCUMENTS

| 2007/0184318 A1 | 8/2007 | Katano |
| 2008/0280176 A1 | 11/2008 | Fukuda |
| 2012/0107706 A1 | 5/2012 | Tanaka et al. |

FOREIGN PATENT DOCUMENTS

| CN | 102804469 A | 11/2012 |
| JP | 2002-110211 A | 4/2002 |
| JP | 2002-313388 A | 10/2002 |
| JP | 2004-172024 A | 6/2004 |
| JP | 2005-044748 A | 2/2005 |
| JP | 2005-063712 A | 3/2005 |
| JP | 2005-100827 A | 4/2005 |
| JP | 2005-302555 A | 10/2005 |
| JP | 2006-019124 A | 1/2006 |
| JP | 2006-134680 A | 5/2006 |
| JP | 2006-221980 A | 8/2006 |
| JP | 2006-331671 A | 12/2006 |

(Continued)

OTHER PUBLICATIONS

International Search Report mailed Nov. 17, 2009 of PCT/JP2009/064613.

*Primary Examiner* — Carlos Barcena
(74) *Attorney, Agent, or Firm* — Kenyon & Kenyon LLP

(57) ABSTRACT

When starting operation of a fuel cell below the freezing point, a fuel cell system adjusts the open degree of a hydrogen pressure adjusting valve, introduces hydrogen to a hydrogen entrance of the fuel cell so as to make the total pressure of the hydrogen entrance a first pressure, and starts a hydrogen circulation pump. If at least one of the cell voltages acquired by a cell voltmeter is below a predetermined voltage, the system determines that clogging is caused in a hydrogen flow channel in the fuel cell. When it is determined that clogging is present, the open degree of the pressure adjusting valve is adjusted and hydrogen is introduced to the hydrogen entrance so that the total pressure of the hydrogen entrance is a second pressure which is higher than the first pressure. Then, the hydrogen circulation pump is stopped and the fuel cell is warmed up to dissolve the clogging of the hydrogen flow channel. Thus, it is possible to suppress degradation of the fuel cell upon an operation start below the freezing point.

4 Claims, 12 Drawing Sheets

(56) References Cited

FOREIGN PATENT DOCUMENTS

| | | |
|---|---|---|
| JP | 2007-184202 A | 7/2007 |
| JP | 2007-220425 A | 8/2007 |
| JP | 2007-294121 A | 11/2007 |
| JP | 2008-034135 A | 2/2008 |
| JP | 2008-041625 A | 2/2008 |
| JP | 2008-071747 A | 3/2008 |
| JP | 2008-153032 A | 7/2008 |
| JP | 2008-181768 A | 8/2008 |
| JP | 2008-198439 A | 8/2008 |
| JP | 2008181768 A * | 8/2008 |
| JP | 2009-004243 A | 1/2009 |

* cited by examiner

US 8,691,461 B2

FUEL CELL SYSTEM

TECHNICAL FIELD

The present invention relates to a startup control of a fuel cell system.

BACKGROUND ART

Fuel cell systems in many cases use fuel cells in which an electrolyte membrane is sandwiched between a fuel electrode and oxidant electrode; and water is generated at the oxidant electrode at the same time as electric power is generated by an electrochemical reaction between hydrogen supplied to the fuel electrode and oxygen in the air supplied to the oxidant electrode.

In such fuel cells, a predetermined voltage and electric current cannot be output under operation in a temperature lower than a normal operation temperature. Furthermore, when freezing occurs with a temperature falling below the freezing point during a non-operation period, in many cases, a warm-up operation is performed after a start-up until a normal operation temperature is reached. As a method of the warm-up operation, a low-efficiency operation is performed in which an amount of air supplied to a fuel cell is reduced to warm-up the fuel cell by using the increased heat loss.

In such a warm-up operation, when the amount of hydrogen supplied to a fuel cell becomes insufficient, there is a risk that a catalyst may be lost by carbon oxidation or a membrane may be damaged due to generated heat. When such a shortage of hydrogen occurs in a fuel cell, the voltage of the fuel cell becomes negative. Therefore, it has been suggested that the warm-up operation be inhibited or output of the fuel cell be limited when the voltage becomes negative due to a shortage of hydrogen gas during a warm-up operation of fuel cell (for example, refer to Patent Document 1).

It has been also suggested that when a fuel cell comprising a plurality of unit cells is started-up under a low temperature, a fuel cell degradation due to a shortage of gas is suppressed and the warm-up of fuel cell is performed in a short period of time even when a gas flow channel is clogged due to freezing by providing, with each of the unit cells, a cell stoichiometric ratio calculator for calculating a stoichiometric ratio of a certain gas and a gas amount increasing unit for increasing an amount of supply of the certain gas when the obtained stoichiometric ratio is lower than a predetermined value (for example, refer to Patent Document 2).

Further, a method has been suggested for blowing condensate in a gas flow channel by partially recycling anode-off gas through an anode off-gas recycle line when the amount of fuel gas flow supplied to a fuel cell is small and a gas flow channel at an anode side is clogged due to the condensate (for example, refer to Patent Document 3).

Furthermore, by using that a power generation efficiency is reduced when a supply pressure of hydrogen gas to a fuel cell is lowered, another method has suggested for performing an warm-up operation of a fuel cell by lowering a supply pressure of hydrogen gas to a fuel cell at a startup of the fuel cell than in a normal operation (for example, refer to Patent Document 4).

PRIOR ART DOCUMENT

Patent Documents

Patent Document 1: JP 2008-198439A
Patent Document 2: JP 2007-184202A
Patent Document 3: JP 2006-134680A
Patent Document 4: JP 2002-313388A

DISCLOSURE OF THE INVENTION

Objects to be Achieved by the Invention

In fuel cells, a stable power generation is enabled by supplying a larger amount of hydrogen than required for power generation. Therefore, not all hydrogen gas supplied to a fuel cell reacts to be electric outputs, but some portions of hydrogen gas is exhausted from a hydrogen gas outlet of the fuel cell as unreacted gas together with nitrogen or other gas in the system, and recycled into a hydrogen gas inlet by a hydrogen gas circulation pump. In many cases, the device is configured such that, when the nitrogen or other gas in the hydrogen system begins to be condensed during operation, hydrogen partial pressure required for power generation is obtained by exhausting the unreacted gas from the hydrogen system out to the air to lower nitrogen partial pressure. As a result, the gas supplied from the hydrogen inlet of the fuel gas includes hydrogen gas and nitrogen gas. There is a risk that residual moisture in the hydrogen gas system may freeze when the fuel cell is not in operation below the freezing point to cause a partial clog in a hydrogen gas flow channel. If the hydrogen system is designed as a recycle system, a gas mixture of hydrogen and nitrogen flows into the clogged flow channel. Because nitrogen gas cannot be exhausted from the clogged flow channel while hydrogen is consumed for power generation, nitrogen is stacked and condensed in the clogged flow channel. Therefore, there is a problem that the partial pressure of the nitrogen in a clogged hydrogen flow channel rapidly increases to cause the power generation voltage of the clogged cell to be a negative voltage.

Because such a negative voltage caused by the accumulation of nitrogen in a hydrogen gas flow channel occurs immediately after a start of power generation by a fuel cell, the conventional techniques described in Patent Documents 1 and 2 have a problem that a fuel cell deteriorates at a start-up below the freezing point because each cell has to perform a warm-up operation in a negative voltage after the start of the fuel cell.

An object of the present invention is to suppress a degradation of fuel cell at a start-up below the freezing point.

Means for Achieving the Objects

A fuel cell system according to an embodiment of the present invention comprises a fuel cell that includes a plurality of stacked cells for generating power by an electrochemical reaction between fuel gas and oxidant gas; a pressure adjusting valve that is disposed between a fuel tank and a fuel gas inlet of the fuel cell for adjusting a gas pressure at the fuel gas inlet; a gas circulation pump that circulates the reacted fuel gas from a fuel gas outlet of the fuel cell to the fuel gas inlet; a cell voltage acquisition unit that acquires a voltage of each of the cells; and a controller that performs a start-up and a stop of the gas circulation pump and adjusts an open degree of the pressure adjusting valve. The controller comprises a clog determination unit that, at a start of the fuel cell, introduces the fuel gas into the fuel gas inlet while adjusting the open degree of the pressure adjusting valve to control the gas pressure at the fuel gas inlet to be a first pressure, starts the fuel gas circulation pump, and determines that a clog is present in a fuel gas flow channel inside the fuel cell when at least one voltage of each of the cells acquired by the cell voltage acquisition unit is lower than a predetermined voltage; and a clog elimination unit that removes the clog of the fuel gas flow channel when the clog determination unit has determined that the clog is present in the fuel gas flow channel, by adjusting the open degree of the pressure adjusting valve, introducing the fuel gas into the fuel gas inlet to control the gas pressure at the fuel gas inlet to be a second pressure which is higher than the first pressure, and stopping the fuel gas circulation pump.

In a fuel cell system according to an embodiment of the present invention, after lowering an output electric current of the fuel cell until the negative voltage of each of the cells is removed, the clog elimination unit may increase the output electric current to a predetermined electric current.

In a fuel cell system according to an embodiment of the present invention, the fuel cell system may further comprise a cell electric current density distribution acquisition unit that senses an electric current density distribution of each of the cells. The clog determination unit may determine that the clog is present in the fuel gas flow channel when the electric current density distribution of each of the cells acquired by the cell electric current density distribution acquisition unit shows an unbalance more than a threshold. The cell electric current density distribution acquisition unit may be a pair of partial electric current sensor strips, each disposed at a fuel gas upstream side and a fuel gas downstream side of each of the cells. It may be determined that the clog is present when a difference between an electric current density sensed by the partial electric current sensor strip disposed at the fuel gas upstream side of the each pair of the partial electric current sensor strips and an electric current density sensed by the partial electric current sensor strip disposed at the fuel gas downstream side is more than the threshold.

Effects of the Invention

The present invention provides an advantage that a degradation of fuel cell at a start-up below the freezing point can be suppressed.

Figure 1:
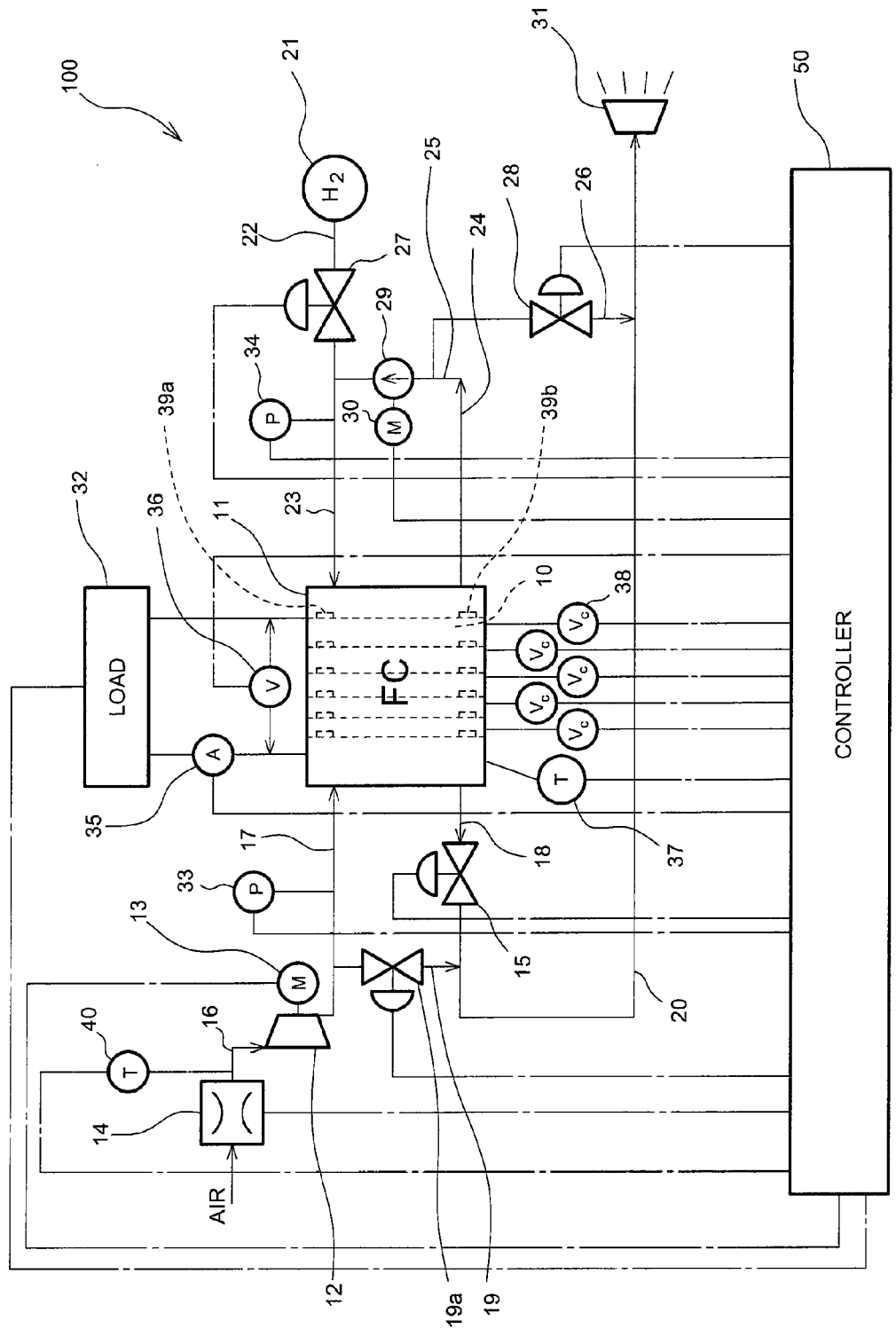
FIG. 1 is a block diagram showing a configuration of a fuel cell system according to an embodiment of the present invention.

REFERENCE NUMERALS 10 cell, 11 fuel cell, 12 air compressor, 13, 30 motor, 14 air-flow meter, 15 air pressure adjusting valve, 16 air intake pipe, 17 air supply pipe, 18 air exhaust pipe, 19 bypass pipe, 19a bypass valve, 20 exhaust pipe, 21 hydrogen gas tank, 22 hydrogen supply pipe, 23 hydrogen inlet pipe, 24 hydrogen outlet pipe, 25 hydrogen recycle pipe, 26 hydrogen exhaust pipe, 27 hydrogen pressure adjusting valve, 28 hydrogen exhaust valve, 29 hydrogen circulation pump, 31 discharge-to-air outlet, 32 load, 33, 34 pressure sensor, 35 electric current sensor, 36 voltage sensor, 37, 40 temperature sensor, 38 cell voltmeter, 39 pair of partial electric current sensor strips, 39a, 39b partial electric current sensor strip, 50 controller, 61 to 64 hydrogen flow channel, 65, 66 gas mixture, 71 electrolyte membrane, 72 catalyst, 73 diffusion layer, 74 hydrogen flow channel, 75 ice grains, 76 ice particles, 100 fuel cell system.

BEST MODE FOR CARRYING OUT THE INVENTION

Embodiments according to the present invention are described below by referring to the attached drawings. As shown in FIG. 1, in a fuel cell 11 of a fuel cell system 100 according to an embodiment of the present invention, a plurality of cells 10 are stacked which uses air including oxygen as oxidant gas and hydrogen as fuel gas. Air used as oxidant gas is taken from the atmosphere into an air compressor 12 through an air intake pipe 16 via an air-flow meter 14. After a pressure is applied by the air compressor 12, the air is discharged and supplied from an air supply pipe 17 into the fuel cell 11. The air intake pipe 16 is provided with a temperature sensor 40 for measuring the temperature of the intake air. As the air taken into the fuel cell 11 passes in an air flow channel disposed inside the fuel cell 11 while the air is reacting with hydrogen supplied from a hydrogen system, the amount of oxygen in the air decreases. Then, the amount of water generated as a result of the reaction increases in the air flow channel as water vapor or droplets. Such reacted air including an increased amount of water is exhausted from the air flow channel inside the fuel cell 11 to the air exhaust pipe 18. The air exhaust pipe 18 is provided with an air pressure adjusting valve 15 for adjusting the air pressure in the air flow channel inside the fuel cell 11. The air supply pipe 17 is provided with a pressure sensor 33 for measuring an air pressure. Further, a bypass pipe 19 is provided such that a portion of the intake air is not supplied to the fuel cell 11 but flowed into the air exhaust pipe 18 disposed at a downstream side of the air pressure adjusting valve 15. The bypass pipe 19 is provided with a bypass valve 19a which adjusts a flow amount of bypassed air. The air exhaust pipe 18 and bypass pipe 19 are merged and connected to the exhaust pipe 20. The air which has flowed into the exhaust pipe 20 is exhausted to the air from a discharge-to-air outlet 31. The amount of air flow which enters into the fuel cell system 100 is adjusted by adjusting the rotational speed of motor 13 of the air compressor 12.

The hydrogen gas to be used as fuel gas is stored in a hydrogen gas tank 21. Hydrogen is supplied from the hydrogen gas tank 21 via a hydrogen supply pipe 22 and hydrogen inlet pipe 23, and then to a hydrogen flow channel disposed inside the fuel cell 11. A portion of hydrogen which has entered into the hydrogen flow channel of the fuel cell 11 is consumed for generating power, while the unconsumed hydrogen is exhausted from the hydrogen flow channel inside the fuel cell 11 to a hydrogen output pipe 24. The reacted hydrogen gas and other gas which have been exhausted to the hydrogen output pipe 24 are recycled to the hydrogen inlet pipe 23 after being pressurized by a hydrogen circulation pump 29 provided with a hydrogen recycle pipe 25. The hydrogen circulation pump 29 is driven by a motor 30. When the concentration of hydrogen decreases as the hydrogen is consumed for generating power resulting in an increase of the amount of impurities such as nitrogen, the hydrogen exhaust valve 28 is opened to exhaust the reacted hydrogen gas via the hydrogen exhaust pipe 26 to the exhaust pipe 20. Then, the hydrogen is discharged into the air from the discharge-to-air outlet 31 after being attenuated by discharged air. The hydrogen supply pipe 22 is provided with a hydrogen pressure adjusting valve 27 for adjusting the pressure of hydrogenous gas of the fuel cell 11. The hydrogen inlet pipe 23 is provided with a pressure sensor 34 for measuring a total pressure of gas at the hydrogen inlet of the fuel cell 11. The total pressure at the hydrogen inlet of the fuel cell 11 is adjusted by the hydrogen pressure adjusting valve 27.

With a load 32 connected to the fuel cell 11, the fuel cell 11 is provided with a voltage sensor 36 for measuring an output voltage from the fuel cell 11 to the load 32, and an electric current sensor 35 for measuring an output electric current. The fuel cell 11 is further provided with a temperature sensor 37 for measuring a temperature of the fuel cell 11; partial electric current sensor strips 39a, 39b, respectively provided at the upstream side and downstream side of the hydrogen flow channel in each cell 10; and a cell voltmeter 38 for measuring a voltage of each cell 10. A pair of the partial electric current sensor strips 39a, 39b respectively provided at the upstream side and downstream side of each cell 10 forms one pair of partial electric current sensor strips 39. A controller 50 is connected with a motor 13 of an air compressor 12, air pressure adjusting valve 15, bypass valve 19a, hydrogen pressure adjusting valve 27, motor 30 of hydrogen circulation pump 29, hydrogen exhaust valve 28, and the load 32, which are configured to operate in accordance with instructions from the controller 50. The controller 50 is further connected with the air-flow meter 14, pressure sensors 33, 34, voltage sensor 36, electric current sensor 35, temperature sensors 37, 40, cell voltmeter 38, and partial electric current sensor strips 39a, 39b, which are configured to be capable of inputting each of received signals into the controller 50. The controller 50 internally includes a CPU for signal processing, control program, and memory for storing control or other data. It should be noted that the dash-dot lines in FIG. 1 show signal lines.

The operations of the fuel cell system 100 according to an embodiment of the present invention are described by referring to FIGS. 2 to 8. As shown in step S101 in FIG. 2, when the fuel cell system 100 is started-up, the controller 50 obtains the air temperature by the temperature sensor 40. Then, as shown in step S102, when the obtained air temperature is below the freezing point, the fuel cell system 100 performs a low temperature start-up in which the fuel cell 11 is started-up while performing a warm-up operation. On the other hand, when the air temperature obtained by the temperature sensor 40 is above the freezing point, the fuel cell system 100 performs a normal start-up in which the fuel cell 11 is started-up without performing the warm-up operation as shown in step S118 in FIG. 2.

When the air temperature is determined to be below the freezing point in step S102 in FIG. 2, the controller 50 starts-up, at time $t_1$ in FIG. 3, the air compressor 12 by driving the motor 13 of the air compressor 12 as shown in step S103 in FIG. 2; starts-up the hydrogen circulation pump 29 by driving the motor 30 of the hydrogen circulation pump 29 as shown in step S104 in FIG. 2; and adjusts the open degree of the hydrogen pressure adjusting valve 27 such that the total pressure $P_T$ at the hydrogen inlet of the fuel cell 11 obtained by the pressure sensor 34 becomes a total pressure $P_{1T}$. Thus, when the hydrogen and air are injected into the fuel cell 11, a cell voltage $V_C$ of the cell 10 starts increasing from time $t_1$ as shown in FIG. 3.

In order to perform a warm-up operation of the fuel cell 11, the amount of air supplied to the fuel cell 11 is reduced than the amount of air in a normal operation such that the power generation of the fuel cell 11 is performed in lower efficiency to perform the warm-up operation of the fuel cell 11 by using lost heat from the fuel cell 11. Thus, as shown by in FIG. 4, when the amount of air flow supplied into the fuel cell 11 is reduced than the amount in a normal operation, the electric current-voltage characteristics of the fuel cell 11 shows a gradient like the solid line "b" steeper than the broken line "a" which shows the electric current-voltage characteristics in a normal operation. Therefore, when the amount of air flow is maintained unchanged at the low level, the output voltage and output electric current of the fuel cell 11 changes along the line "b". With the voltage at $V_0$, the output electric current I from the fuel cell 11 is zero.

Figure 2:
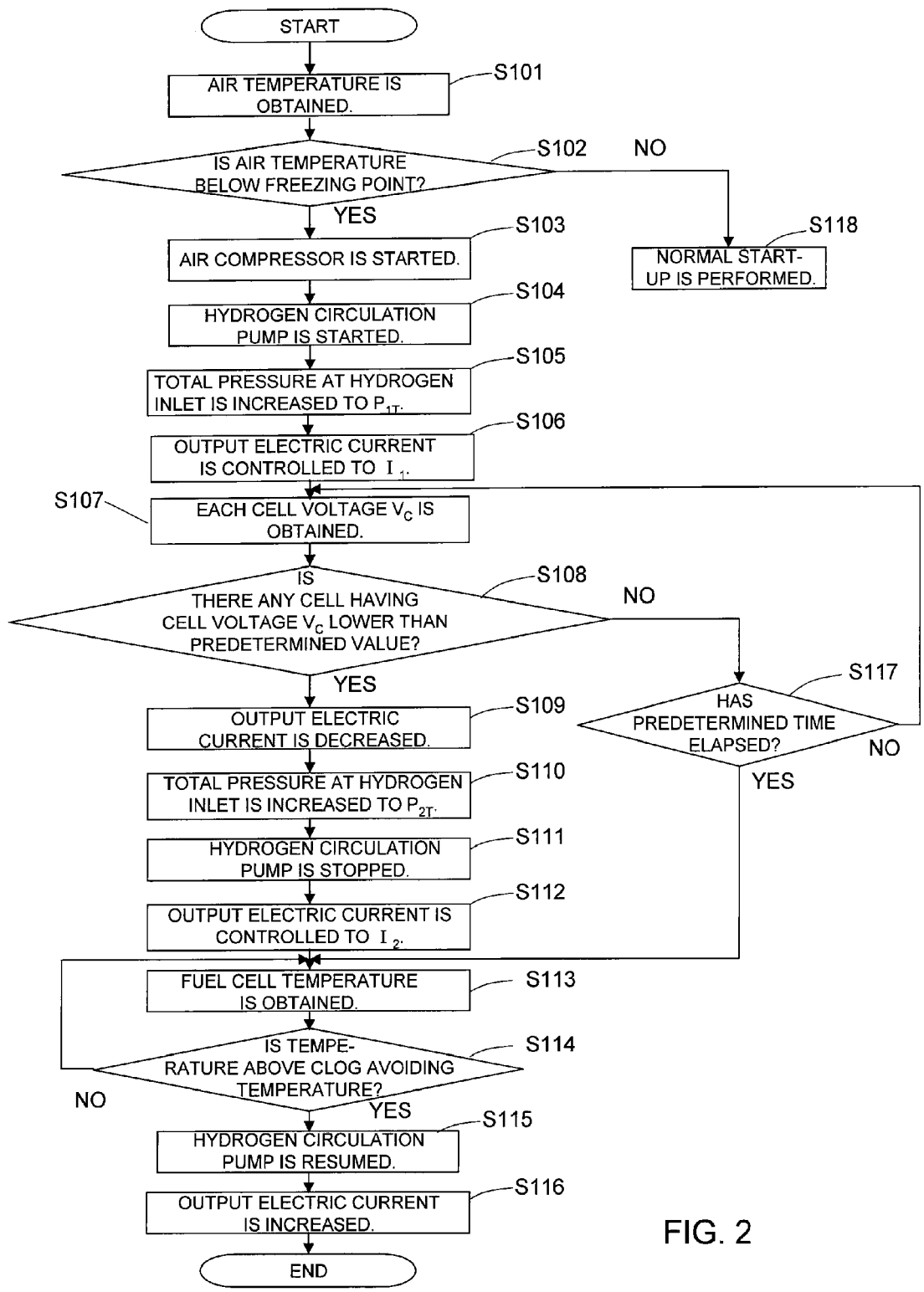
FIG. 2 is a flowchart showing a start-up operation flow of a fuel cell system according to an embodiment of the present invention.
Figure 3:
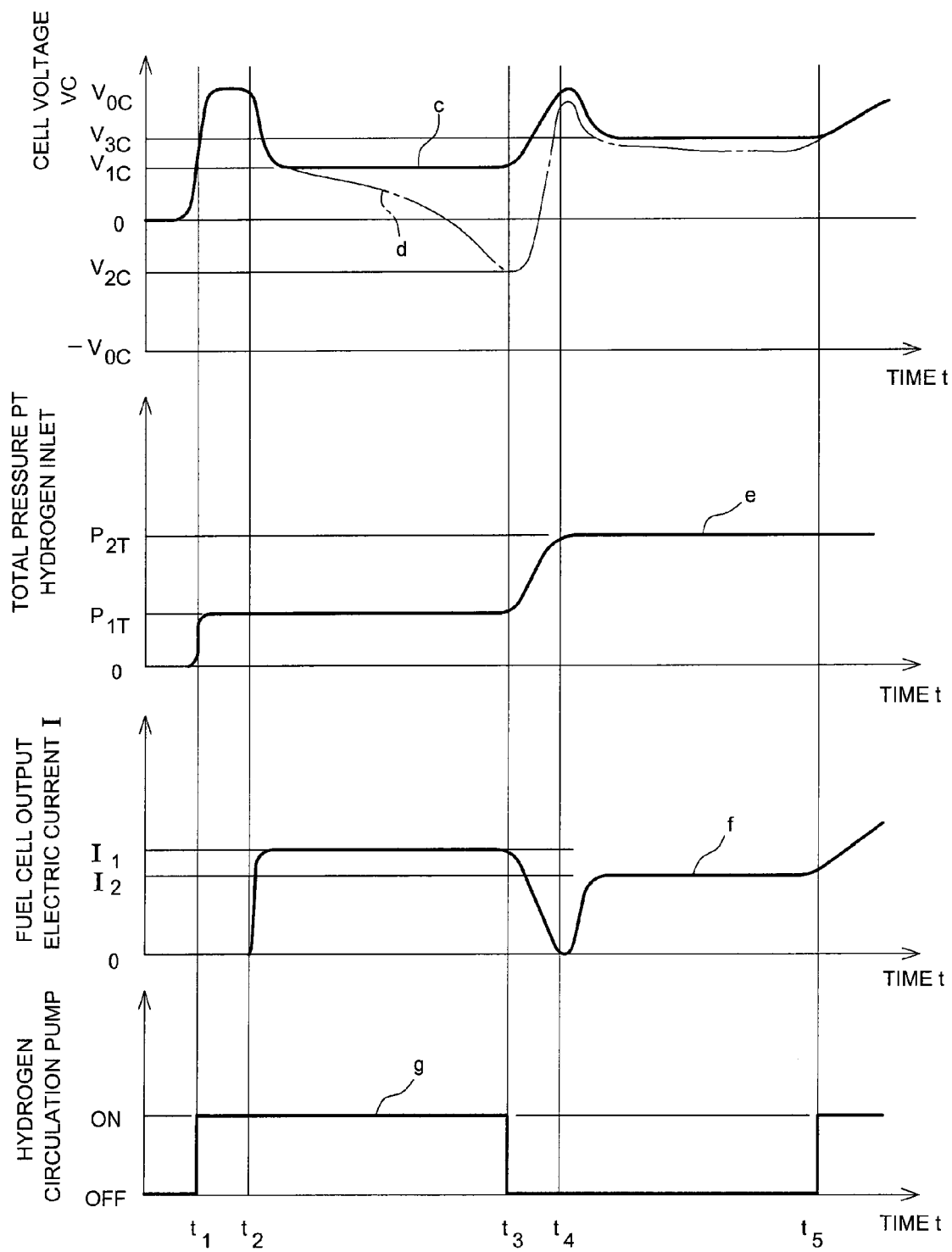
FIG. 3 is a time chart showing a cell voltage, total pressure at a hydrogen inlet, output electric current of a fuel cell, and operation of hydrogen circulation pump at a start-up of a fuel cell system according to an embodiment of the present invention.
Figure 4:
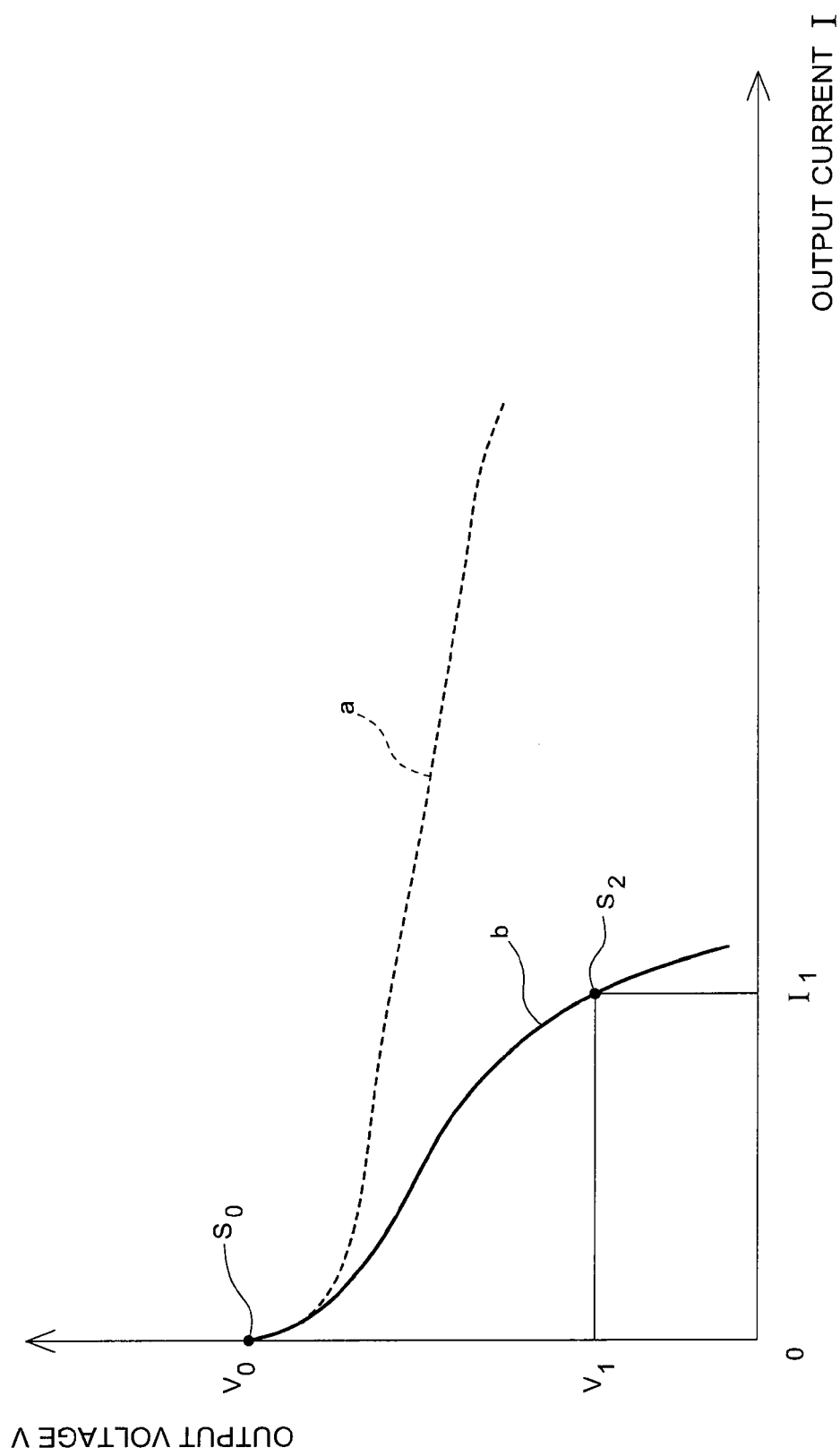
FIG. 4 is a graph showing characteristics of electric current and voltage of a fuel cell in a warm-up operation.

Because, at time $t_1$, the controller 50 starts-up the fuel cell 11 while maintaining the voltage of the load 32 at $V_0$ and reduces the amount of air flow such that the electric current-voltage characteristics of the fuel cell 11 shows the line "b" in FIG. 4, the cell voltage $V_C$ of each cell 10 of the fuel cell 11 increases up to $V_{0C}$ in FIG. 3. The output electric current I from the fuel cell 11 is zero. After confirming that the cell voltage $V_C$ of each cell 10 is above a predetermined voltage, the controller 50 lowers the output voltage V of the fuel cell 11 by lowering the voltage of the load 32 at time $t_2$ shown in FIG. 3. Then, the operation status of the fuel cell 11 changes along the line "b" in FIG. 4 such that the output electric current I from the fuel cell 11 gradually increases as the output voltage V of the fuel cell 11 decreases from $V_0$. As shown in FIG. 4, the controller 50 lowers the output voltage V down to $V_1$ such that the output electric current I of the fuel cell 11 becomes $I_1$. As shown in step S106 in FIG. 2, the output electric current I from the fuel cell 11 becomes $I_1$.

Figure 5:
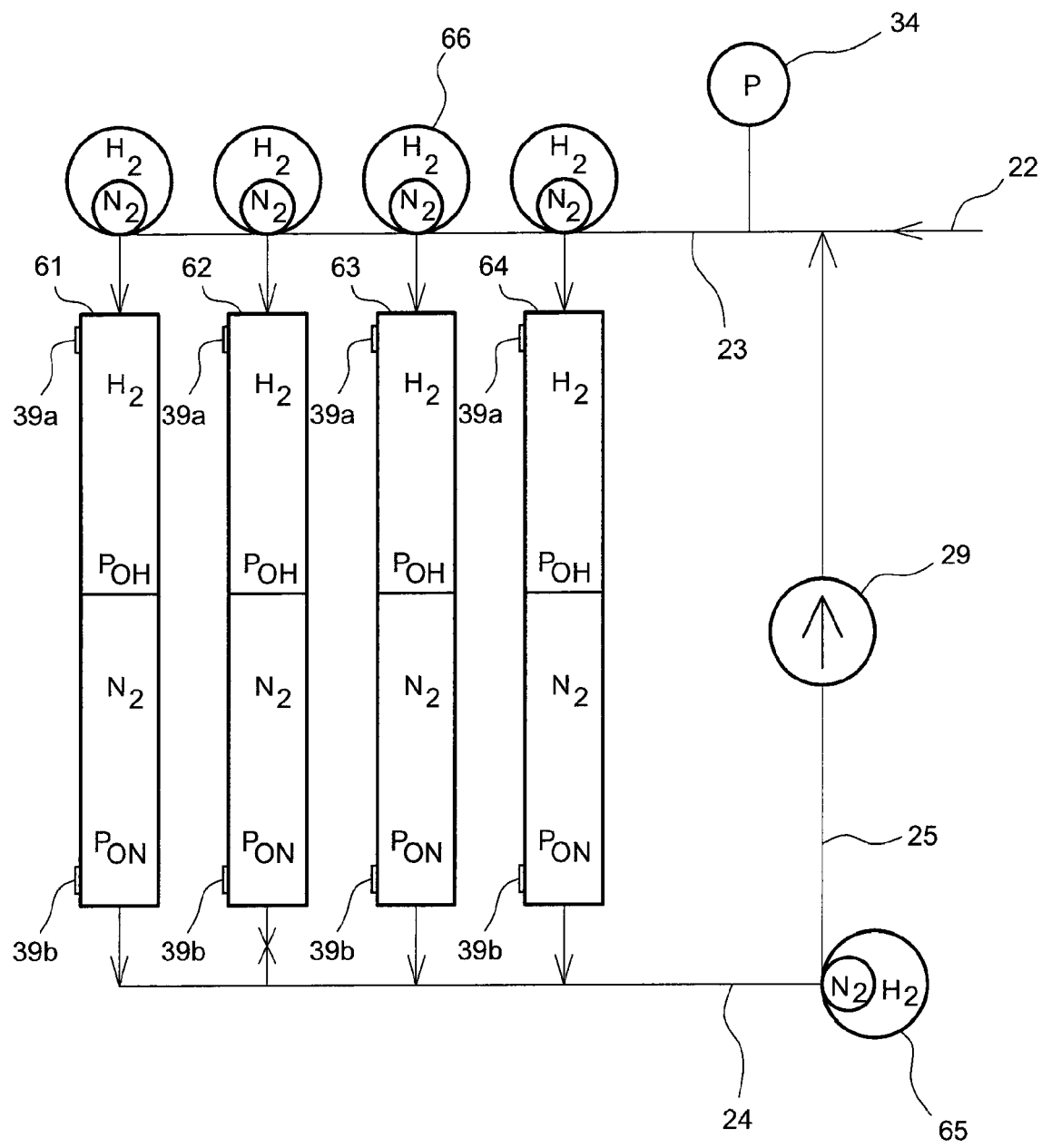
FIG. 5 is a diagram representing a partial pressure of hydrogen and nitrogen in a cell when the total pressure at a hydrogen inlet is increased to a first pressure according to an embodiment of the present invention.

FIG. 5 is a schematic diagram showing the hydrogen electrodes when hydrogen is injected into the fuel cell 11 at a start of the operation. Before the injection of hydrogen, nitrogen is retained inside each of hydrogen flow channels 61 to 64 at a partial pressure $P_{ON}$, for example, 50 kPa, which is slightly lower than the partial pressure of nitrogen in the air (80 kPa). Hydrogen is injected into the hydrogen inlet pipe 23 from the hydrogen supply pipe 22 such that the partial pressure of hydrogen $P_{OH}$ becomes about equal to the partial pressure $P_{ON}$ of the retained nitrogen, for example, about 50 kPa. Thus, the hydrogen pressure adjusting valve 27 is adjusted such that the total pressure $P_T$ at the hydrogen inlet of the fuel cell 11 sensed by the pressure sensor 34 becomes "$P_T = P_{ON} + P_{OH}$=total pressure $P_{1T}$". For example, when the partial pressure $P_{ON}$ of the retained nitrogen is about 50 kPa and the partial pressure of $P_{OH}$ of the pressurized hydrogen is about 50 kPa, the hydrogen pressure adjusting valve 27 is adjusted such that the total pressure $P_{1T}$ at the hydrogen inlet becomes "$P_{1T}$=50+50=100 kPa". The total pressure $P_{1T}$ at the hydrogen inlet is a first pressure which is lower than the total pressure $P_T$ (about 250 kPa) at the hydrogen inlet at a normal start-up of the fuel cell 11. It should be noted that although hydrogen and nitrogen are illustrated to be separated from each other in the schematic diagram, in fact, the hydrogen and nitrogen are mixed in the hydrogen flow channels 61 to 64.

A clog is present in a hydrogen flow channel 62 shown in FIG. 5, preventing gas from flowing into the hydrogen outlet pipe 24 from the hydrogen flow channel 62. The hydrogen circulation pump 29 inhales gas mixture 65 of hydrogen and nitrogen from the hydrogen flow channels 61, 63, 64 and recycles the ° gas mixture 65 to the hydrogen inlet pipe 23. On the other hand, hydrogen to be consumed for generating power is supplied from the hydrogen supply pipe 22 to the hydrogen inlet pipe 23. Gas mixture 66 of Hydrogen and nitrogen is supplied to each of the hydrogen flow channels 61 to 64. The gas mixture 66 of hydrogen and nitrogen supplied to each of the hydrogen flow channels 61 to 64 includes more hydrogen than the gas mixture 65 recycled by the hydrogen circulation pump 29 for the amount of hydrogen supplied from the hydrogen supply pipe 22.

Figure 6:
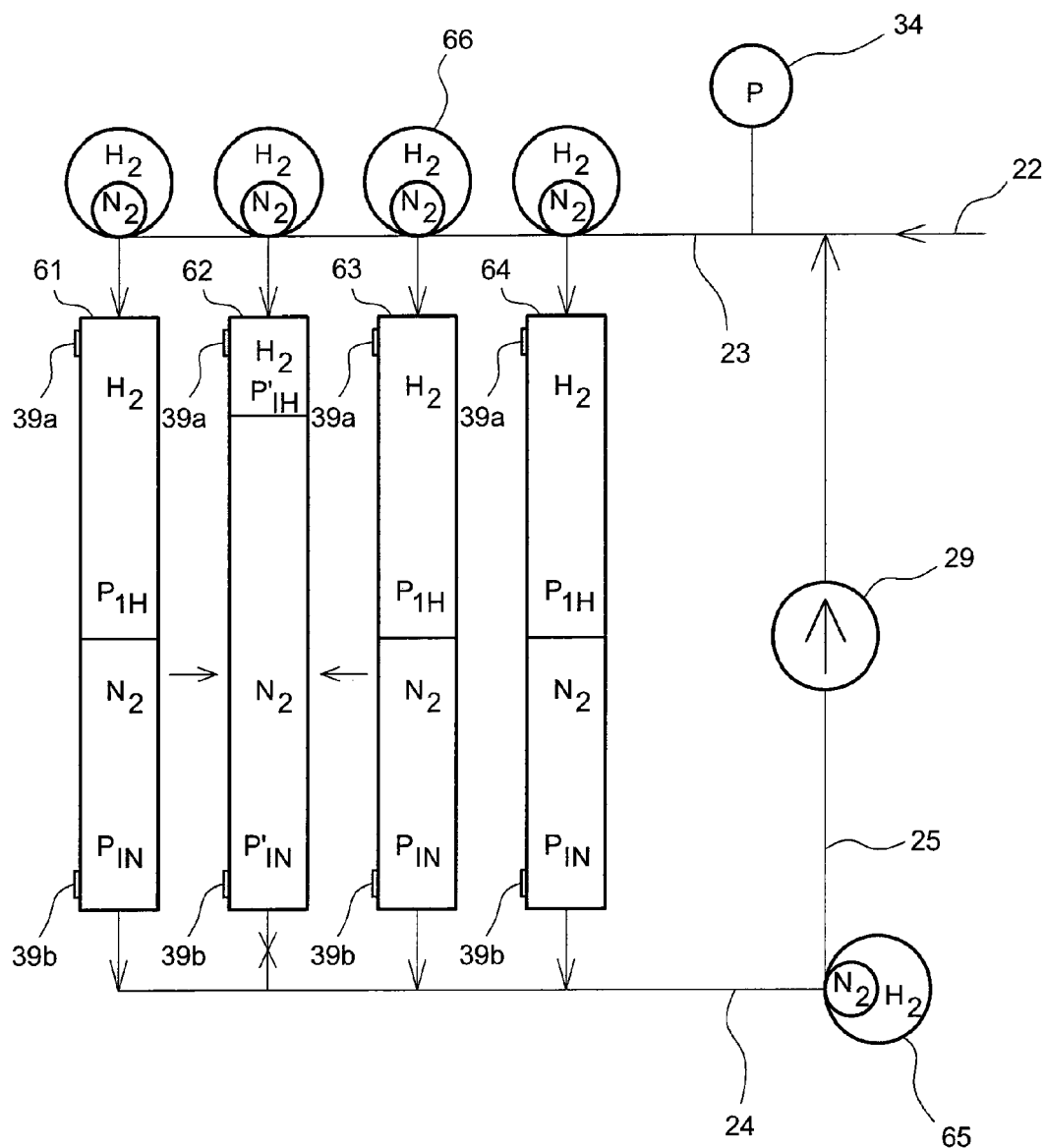
FIG. 6 is a diagram representing a partial pressure of hydrogen and nitrogen in a cell after an operation performed with a total pressure at a hydrogen inlet being a first pressure in an embodiment of the present invention.

When an output electric current I is output from the fuel cell 11 under such circumstances, because hydrogen is consumed for generating power in each of the hydrogen flow channels 61, 63, 64, the gas mixture 65 having a higher nitrogen partial pressure is discharged. On the other hand, as shown in FIG. 6, the clogged hydrogen flow channel 62 receives the gas mixture 66 of hydrogen and nitrogen from the inlet for the amount of hydrogen consumed for generating power. The nitrogen which has entered into the hydrogen flow channel 62 is not consumed for generating power. Further, as the hydrogen flow channel 62 has the clog, the nitrogen does not flow into the hydrogen output pipe 24. Therefore, when power generation is started, the nitrogen partial pressure rapidly increases from the initial partial pressure $P_m$ to a partial pressure $P_{1N}'$ while the hydrogen partial pressure rapidly decreases from the initial partial pressure $P_{OH}$ to a partial pressure $P_{1H}'$. This is because the nitrogen gas from the hydrogen flow channels 61, 63, 64 is stacked and condensed in the clogged hydrogen flow channel 62. The hydrogen and nitrogen partial pressure in the other hydrogen flow channels 61, 63, 64 do not largely change such that the hydrogen partial pressure slightly decreases from the initial partial pressure $P_{OH}$ to a partial pressure $P_{1H}$, while the nitrogen partial pressure slightly increases from the initial partial pressure $P_{ON}$ to a partial pressure $P_{1N}$. Further, the total pressure $P_T$ at the hydrogen inlet of each of the hydrogen flow channels 61 to 64 is maintained at the initial total pressure $P_{1T}$ at the hydrogen inlet. Therefore, as described above, when the hydrogen is injected for the amount of partial pressure 50 kPa to control the total pressure $P_{1t}$ at the hydrogen inlet to 100 kPa, if all of hydrogen in the clogged hydrogen flow channel 62 is consumed for generating power, the hydrogen partial pressure $P_{1H}'$ of the hydrogen flow channel 62 becomes zero, while the nitrogen partial pressure $P_{1N}'$ becomes 100 kPa which is equal to the total pressure $P_{1T}$. Each of the hydrogen partial pressure $P_{1H}$ and nitrogen partial pressure $P_{1N}$ in the other hydrogen flow channels 61, 63, 64 is maintained at 50 kPa.

Thus, when the hydrogen partial pressure of the clogged hydrogen flow channel 62 decreases, a cell voltage $V_C$ of the cell 10 having the hydrogen flow channel 62 gradually decreases and finally becomes a negative voltage. Such a negative voltage occurs in a very short time, for example, about 10 to 20 seconds after the start of outputting electric current from the fuel cell 11 because the initial total pressure $P_T$ at the hydrogen inlet of the fuel cell 11 is at about 100 kPa which is lower than the total pressure (250 kPa) at the hydrogen inlet at a normal startup, and also because the partial pressure $P_{on}$ of the retained nitrogen and the partial pressure of hydrogen are about the same.

As shown in step S107 in FIG. 2, the controller 50 obtains each cell voltage $V_C$ by a cell voltmeter 38 provided with each cell 10. As shown in step S108 in FIG. 2, the controller 50 compares the obtained voltage $V_C$ with a predetermined voltage $V_{2C}$ for this embodiment. When none of the cells 10 have a cell voltage $V_C$ lower than the predetermined voltage $V_2$, the controller 50 determines whether or not a predetermined time has elapsed as shown in step S117 in FIG. 2, and if no, the controller 50 returns to step S107 in FIG. 2 to obtain and compare a cell voltage $V_C$ of each cell 10 to the predetermined voltage $V_{2C}$ again. The predetermined time is a period of time which elapses before a negative voltage occurs, for example, about 10 to 20 seconds as in the above example, or longer. Because the predetermined time should be determined depending on an initially applied pressure of hydrogen, the predetermined time may be variable which is longer with a higher total pressure $P_T$ at the hydrogen inlet at the time of applying pressure to hydrogen.

When there is at least one cell 10 having a cell voltage $V_C$ lower than the predetermined voltage $V_{2C}$ in a predetermined time period, the controller 50 decreases the output electric current I from the fuel cell 11 at time $t_3$ in FIG. 3 as shown in step S109 in FIG. 2. The controller 50 decreases the output electric current I from the fuel cell 11 by increasing the voltage of load 32. Then, the controller 50 increases the voltage of load 32 up to $V_0$ shown in FIG. 4. The controller 50 once sets the output electric current I from the fuel cell 11 to zero at time $t_4$ in FIG. 3, and cell voltage $V_C$ at $V_{0C}$. In this way, as shown by the dash-dot line "d" in FIG. 3, the voltage of the clogged cell 10 recovers to a positive voltage from a negative voltage. It should be noted that the output electric current I from the fuel cell 11 may be an electric current larger than zero as long as the voltage of the clogged cell 10 can recover from a negative voltage to a positive voltage.

Figure 7:
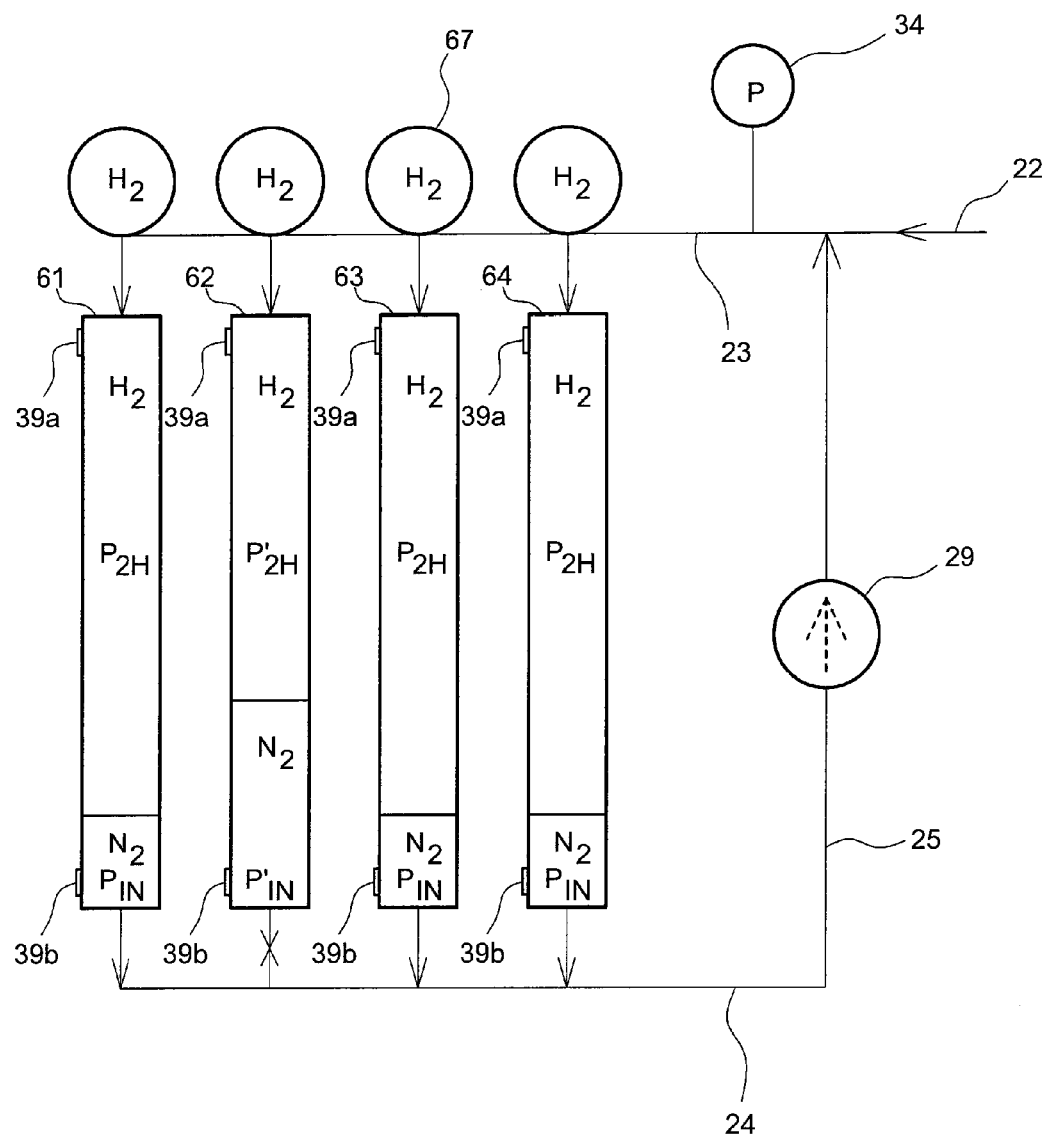
FIG. 7 is a diagram representing a partial pressure of hydrogen and nitrogen in a cell with a total pressure at a hydrogen inlet increased to a second pressure in an embodiment of the present invention.
Figure 8:
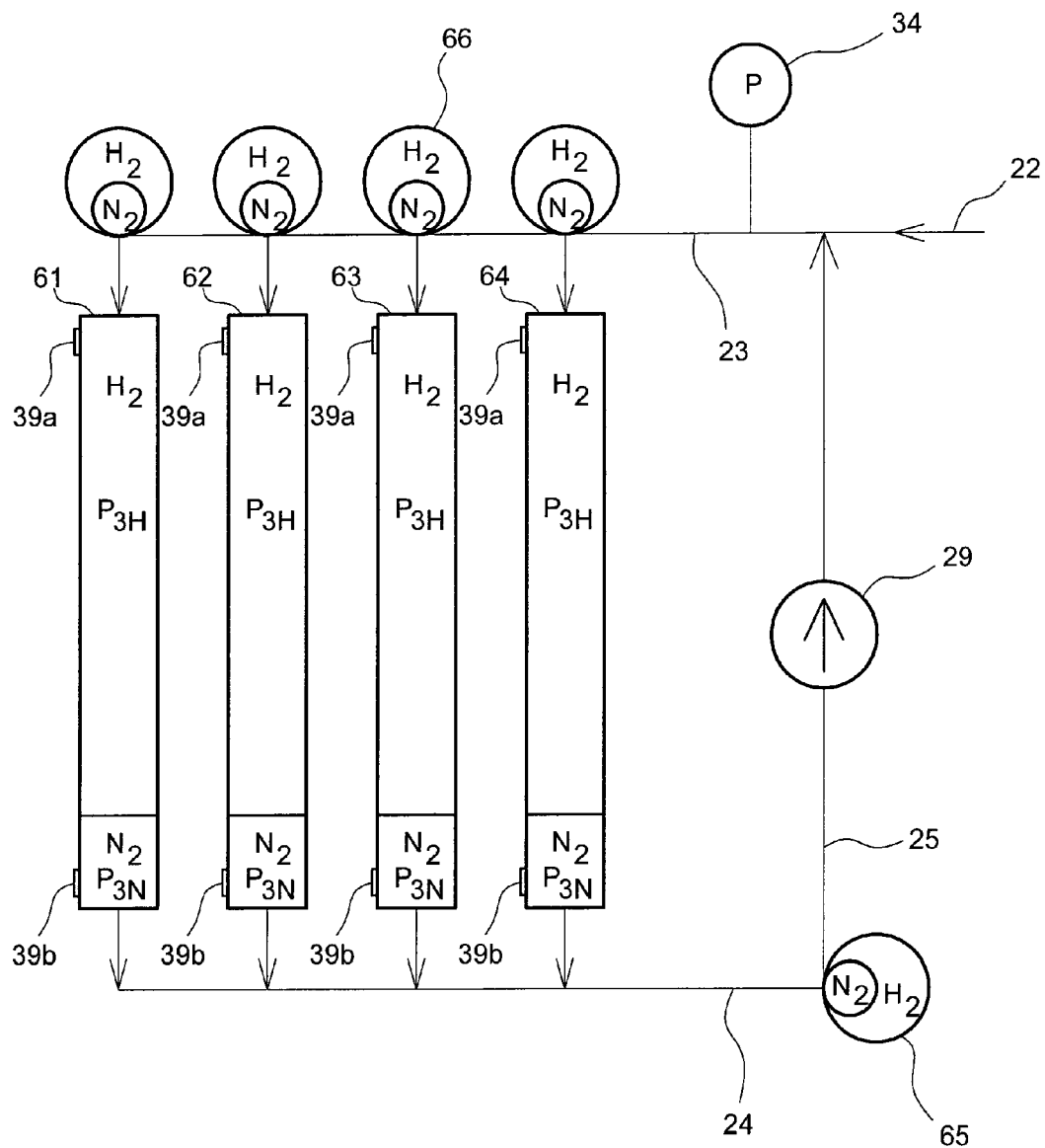
FIG. 8 is a diagram representing a partial pressure of hydrogen and nitrogen in a cell after a removal of a clog according to an embodiment of the present invention.

At substantially simultaneously as starting decreasing the output electric current I from the fuel cell 11, the controller 50 fills the hydrogen flow channels 61 to 64 with hydrogen by adjusting the hydrogen pressure adjusting valve 27 to increase the total pressure $P_T$ at the hydrogen inlet to a total pressure $P_{2T}$ which is higher than the initial total pressure $P_{1T}$ at the hydrogen inlet as shown in step S110 in FIG. 2. The total pressure $P_{2T}$ is a second pressure. As shown in FIG. 7, the hydrogen partial pressure of unclogged hydrogen flow channels 61, 63, 64 increases to $P_{2H}$ from the partial pressure $P_{1H}$ which is the partial pressure before applying the pressure, while the hydrogen partial pressure of the clogged hydrogen flow channel 62 increases to $P_{2H}'$ from the partial pressure $P_{1H}'$ which is the partial pressure before applying the pressure. On the contrary, the nitrogen partial pressure of each hydrogen flow channel 61 to 64 does not change. The nitrogen partial pressure of the unclogged hydrogen flow channels 61, 63, 64 stays at $P_{1N}$, while the nitrogen partial pressure of the clogged hydrogen flow channel 62 stays at $P_{1N}'$. The total pressure $P_{2T}$ at the hydrogen inlet may be the same total pressure as for a normal start-up, for example, 250 kPa. In this case, as described in the above example, after the hydrogen is injected for the amount of partial pressure 50 kPa to control the total pressure $P_{1t}$ at the hydrogen inlet to 100 kPa, if all of hydrogen in the clogged hydrogen flow channel 62 is consumed for generating power and the hydrogen partial pressure $P_{1H}'$ becomes zero while the nitrogen partial pressure $P_{1N}'$ becomes 100 kPa, the hydrogen partial pressure $P_{2H}'$ of the hydrogen flow channel 62 after applying the pressure becomes "250−100=150 kPa", while, after applying the pressure, the partial pressure $P_{2H}$ of hydrogen of the hydrogen flow channels 61, 63, 64 in which the nitrogen partial pressure $P_{1N}$ is maintained at 50 kPa becomes "250−50=200 kPa". Thus, by increasing the total pressure $P_T$ at the hydrogen inlet to the total pressure $P_{2T}$ by injecting hydrogen, the hydrogen partial pressure $P_{H}'$ of the hydrogen flow channel 62 decreased to almost zero due to a clog can be increased to a level in which a power generation is possible. Thus, it becomes possible to resume the power generation by the cell 10 having the hydrogen flow channel 62 which had a negative voltage due to the clog.

The controller 50 stops the motor 30 of the hydrogen circulation pump 29 to stop the hydrogen circulation pump 29 as shown in step S111 in FIG. 2. Thus, by stopping the hydrogen circulation pump 29, flow of nitrogen from the unclogged hydrogen flow channels 61, 63, 64 into the clogged hydrogen flow channel 62 during power generation of the fuel cell 11 can be avoided. Because, during the power generation of fuel cell 11, hydrogen 67 is injected for the amount of hydrogen consumed for generating power in each of hydrogen flow channels 61 to 64, the nitrogen partial pressure $P_{1N}$ and $P_{1N}'$ of each hydrogen flow channels 61 to 64 does not largely increase during the power generation of fuel cell 11. Therefore, the warm-up operation of the fuel cell 11 can be continued.

As shown in step S112 in FIG. 2, the controller 50 controls the output electric current I from the fuel cell 11 to zero at time $t_4$ in FIG. 3, and then, decreases the voltage of the load 32 to lower the output voltage V of the fuel cell 11 to control the output electric current I from the fuel cell 11 to $I_2$ which is lower than $I_1$. The output electric current $I_2$ may be at any value as long as the warm-up operation of the fuel cell 11 can be continued. Depending on the operation status of the fuel cell 11, the output electric current $I_2$ can be the same electric current as the initial output electric current $I_1$.

The controller 50 continues the warm-up operation of the fuel cell 11 in this way until the hydrogen flow channel 62 which was clogged due to freezing is defrosted by a lost heat of the fuel cell 11. As shown in step S113 in FIG. 2, the controller 50 obtains the temperature of the fuel cell 11 by a temperature sensor 37. As shown in step S114 in FIG. 2, the controller 50 compares the obtained temperature with a clog avoiding temperature, such as about 30° C. When the obtained temperature of the fuel cell 11 is higher than the clog avoiding temperature, it is determined that the clog of the hydrogen flow channel 62 has been removed. Then, as shown in step S115 in FIG. 2, the controller 50 starts the motor 30 of the hydrogen circulation pump 29 to resume the hydrogen circulation pump 29.

When the hydrogen circulation pump 29 is resumed, because the clog of the hydrogen flow channel 62 has been removed, a substantially same amount of hydrogen and nitrogen flows enabling a stable operation of the fuel cell 11. Then, as shown in step S116 in FIG. 2, the controller 50 increases the output electric current from the fuel cell 11 by lowering the voltage of the load 32 to further continue the warm-up operation of the fuel cell 11.

As described above, when performing a start-up below the freezing point, a fuel cell system 100 according to an embodiment of the present invention starts an operation with a total pressure at the hydrogen inlet of the fuel cell 11 at a first pressure. Then, after detecting a presence or absence of a clogged cell 10 in a hydrogen flow channel due to freezing in a short time, the fuel cell system 100 performs a warm-up operation of the fuel cell 11 by increasing the total pressure at the hydrogen inlet to a second pressure and also stopping the hydrogen circulation pump 29 when a clog is present. In this way, the fuel cell system 100 achieves an advantage that a degradation of the fuel cell 11 due to a shortage of hydrogen gas can be suppressed because even when a clog occurs in a hydrogen flow channel, a warm-up operation can be performed with no shortage of hydrogen gas.

In the above described embodiment, the description was made by assuming that the first pressure is lower than the hydrogen total pressure at a normal startup. However, the first pressure may be equal to the hydrogen total pressure at a normal startup as long as the difference between the first pressure and the second pressure is enough to enable the injection of hydrogen into the hydrogen flow channel clogged due to freezing for the sufficient amount required for the warm-up operation.

Another embodiment according to the present invention is described below by referring to FIG. 9. The same reference numerals are assigned to the same portions described in the embodiments above by referring to FIGS. 1 to 8 and their descriptions are omitted. As described above by referring to FIGS. 5 and 6, nitrogen flows into a clogged hydrogen flow channel 62 from the other hydrogen flow channels 61, 63, 64 causing an increase of the nitrogen partial pressure. Thus, the cell 10 having the clogged hydrogen flow channel 62 will have a negative voltage. On this occasion, because the hydrogen partial pressure is higher at the upper stream side of the hydrogen flow channel 62 and lower towards the downstream, the electric current density (CD) (the amount of electric current per unit area) during power generation becomes larger at the upstream side of the clogged hydrogen flow channel 62 in the cell 10 while the electric current density (CD) becomes smaller at the downstream side. In a fuel cell 11 according to the present embodiment, gas mixture is injected into the hydrogen flow channels 61 to 64 from the upper side in the gravity direction while reacted gas is discharged from the lower side in the gravity direction. Thus, when a clog occurs in the hydrogen flow channel 62, the heavy nitrogen injected into the clogged hydrogen flow channel 62 gradually moves towards the lower side in the gravity direction, while the hydrogen partial pressure becomes higher at the upstream side resulting in a higher electric current density (CD) at the upstream side.

Figure 9:
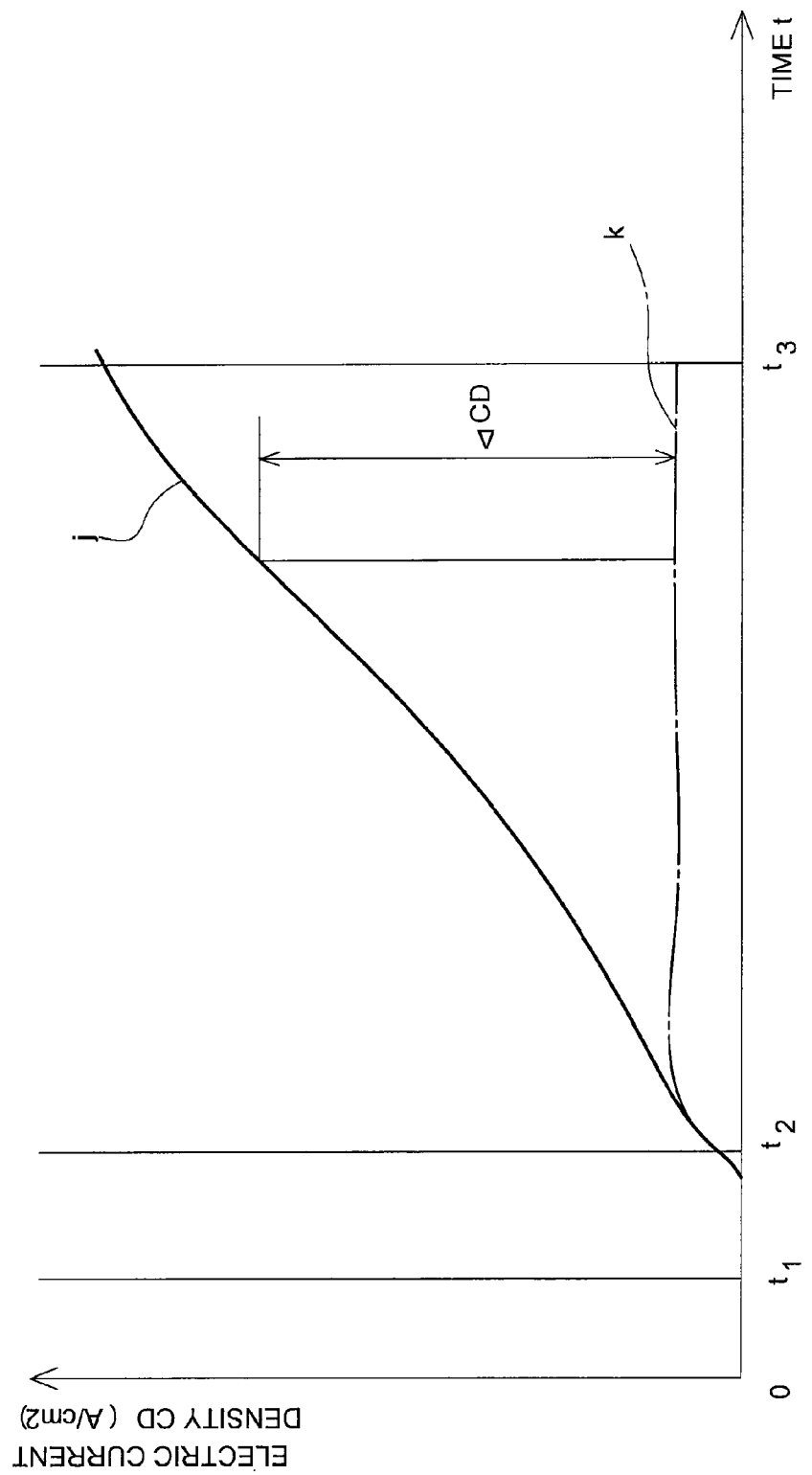
FIG. 9 is a graph showing a change in an electric current density of a cell at a start-up of a fuel cell system according to an embodiment of the present invention.

As shown by a solid line "j" in FIG. 9, the electric current density (CD) at the upstream side of the hydrogen flow channel gradually increases as the power generation of the fuel cell 11 continues. On the contrary, as shown by the dash-dot line "k" in FIG. 9, the electric current density (CD) at the downstream side of the hydrogen flow channel does not increase after reaching a certain level even when the power generation continues. Therefore, the electric current density difference LCD between the upstream side and the downstream side of the hydrogen flow channel becomes larger as time elapses. Thus, with a partial electric current sensor strips 39a, 39b, respectively provided at each of upstream and downstream sides of a hydrogen flow channel in each cell, an occurrence of a clog in a hydrogen flow channel is determined when the difference SCD between the sensed electric current densities CDs exceeds a predetermined threshold. Features other than how to determine a clog in a hydrogen flow channel are the same as those of the embodiments described above by referring to FIGS. 1 to 8.

The present embodiment achieves the same advantage as the previously described embodiments.

Embodiments of the present invention are described above. A reference example is shown below. A fuel cell system 100 according to the present reference example has the same configuration as the embodiment described by referring to FIG. 1. However, in the present reference example, when a start-up below the freezing point is detected, a warm-up operation is performed not by gradually increasing the total pressure at the hydrogen inlet at the start-up from the first pressure to the second pressure, but by increasing the total pressure at the hydrogen inlet to a pressure higher than the hydrogen pressure at a normal start-up without running the hydrogen circulation pump 29.

Figure 12:
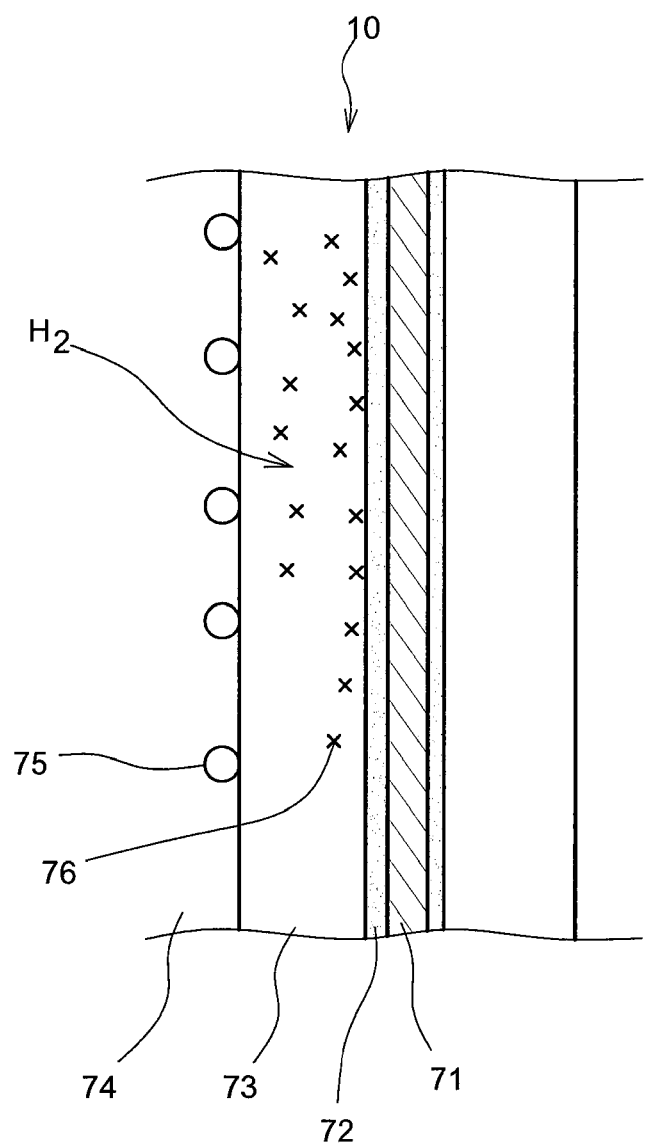
FIG. 12 is an exemplary diagram representing a saturation of hydrogen gas into a diffusion layer in a reference example of the present invention.

The present reference example is described below by referring to FIGS. 10 and 12. As shown in step S201 in FIG. 10, when a fuel cell system 100 is started-up, a controller 50 obtains an air temperature by a temperature sensor 40. Then, as shown in step S202 in FIG. 10, when the obtained air temperature is below the freezing point, a low temperature start-up is performed in which the fuel cell 11 is started-up while performing a warm-up operation. On the other hand, when the air temperature obtained by the temperature sensor 40 is above the freezing point, the controller 50 starts-up the fuel cell 11 in a normal start-up in which no warm-up operation is performed as shown in step S211 in FIG. 10.

When the air temperature is determined to be below the freezing point in step S202 in FIG. 10, the controller 50 drives a motor of an air compressor 12 to start the air compressor 12 as shown in step S203 in FIG. 10. Then, the controller 50 adjusts, as shown in step S204 in FIG. 10, an open degree of a hydrogen pressure adjusting valve 27 such that a total pressure $P_T$ at the hydrogen inlet of the fuel cell 11 obtained by the pressure sensor 34 becomes the total pressure $P_{4T}$, where the total pressure $P_{4T}$ is a pressure higher than the total pressure at the hydrogen inlet when the fuel cell 11 is started-up in a normal temperature. Thus, when the hydrogen and air are injected into the fuel cell 11, the power generation of the fuel cell 11 is started.

Similarly as the embodiments described above, in prior to the injection of hydrogen, nitrogen is retained inside each of the hydrogen flow channels 61 to 64 at a partial pressure $P_{0N}$, for example, about 50 kPa, that is slightly lower than 80 kPa, which is the partial pressure of nitrogen in the air. Hydrogen is injected into each of the hydrogen flow channels 61 to 64 while adjusting the hydrogen pressure adjusting valve 27 such that the total pressure $P_T$ at the hydrogen inlet of the fuel cell 11 sensed by the pressure sensor 34 becomes "$P_T$=the total pressure $P_{4T}$." For example, when the partial pressure of the retained nitrogen $P_{0N}$ is about 50 kPa and the hydrogen pressure adjusting valve 27 is to be adjusted such that the total pressure $P_{4T}$ at the hydrogen inlet becomes 250 kPa, the hydrogen partial pressure $P_{4H}$ in each of hydrogen flow channels 61 to 64 becomes about 250−50=200 kPa.

Because the hydrogen circulation pump 29 is stopped, unlike the embodiments described above by referring to FIGS. 5, 6, no nitrogen flows into the clogged hydrogen flow channel 62 from the unclogged hydrogen flow channels 61, 63, 64 during the power generation of the fuel cell 11. Therefore, during the power generation of the fuel cell 11, hydrogen for the amount of hydrogen in each of the hydrogen flow channels 61 to 64 consumed during the power generation is injected from the hydrogen supply pipe 22. Because the nitrogen partial pressure $P_{0N}$ and hydrogen partial pressure $P_{4H}$ in each of the hydrogen flow channels 61 to 64 do not largely increase during the power generation of the fuel cell 11, the warm-up operation of the fuel cell 11 can be continued while avoiding a shortage of hydrogen in the cell 10 which includes the clogged hydrogen flow channel 62.

Figure 10:
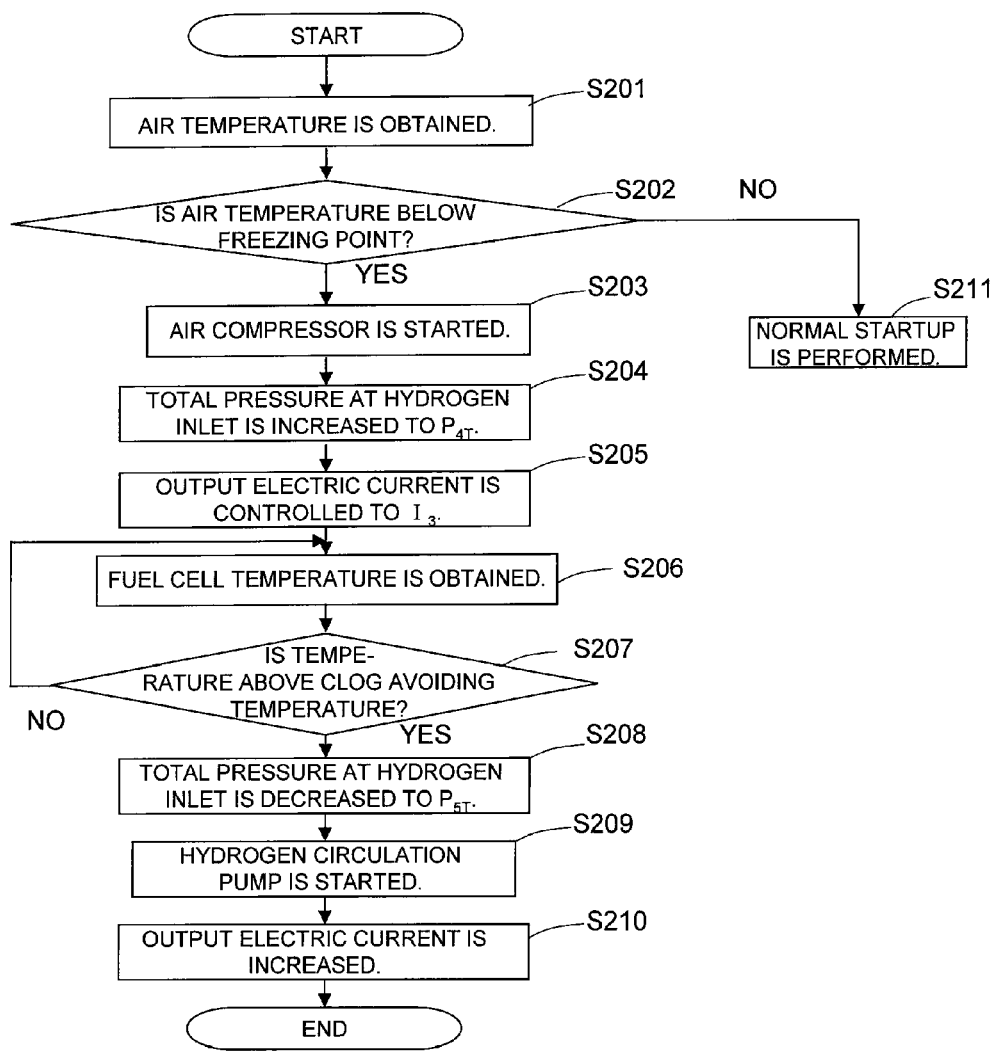
FIG. 10 is a flowchart showing a start-up operation flow of a fuel cell system according to a reference example of the present invention.
Figure 11:
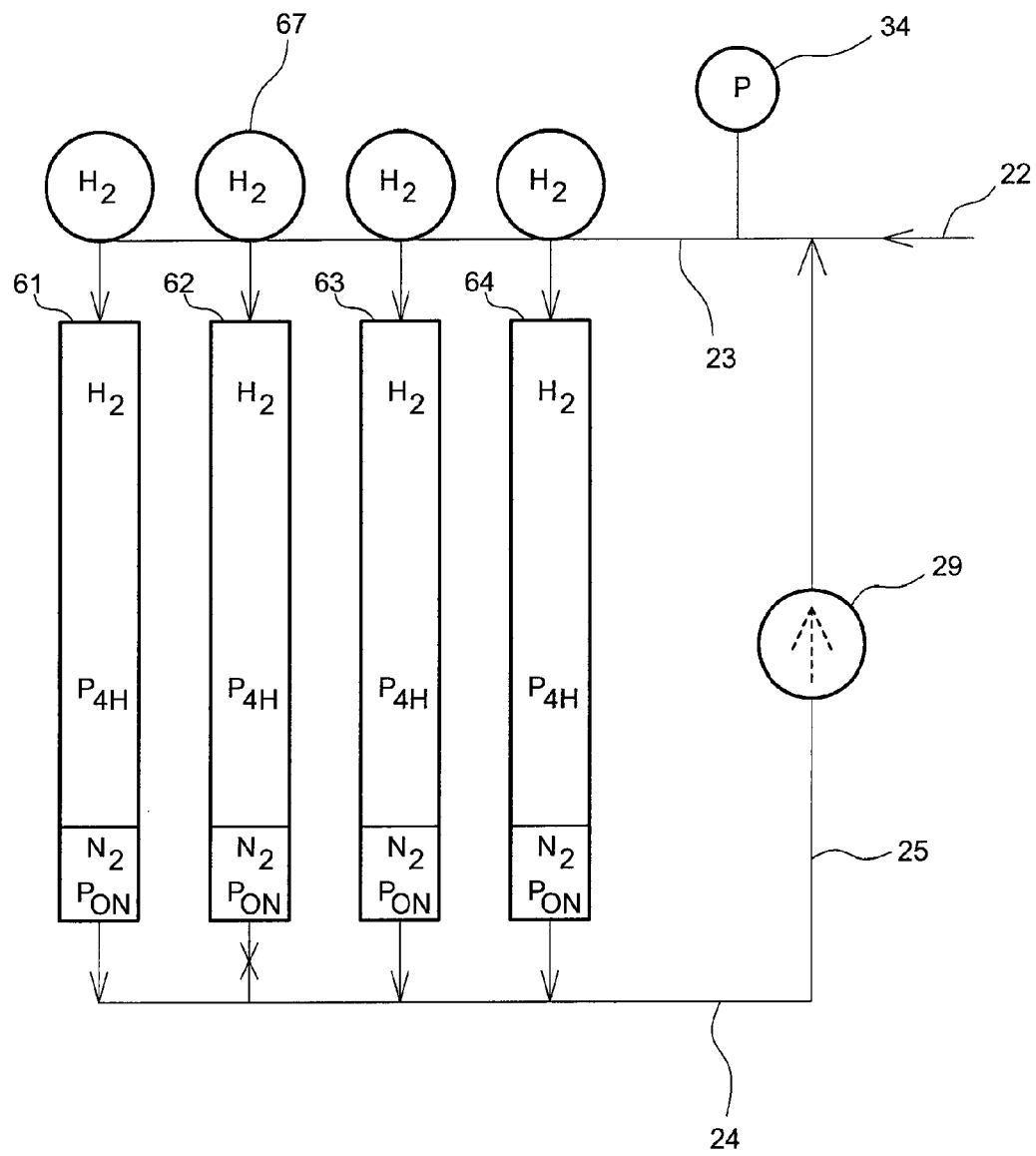
FIG. 11 is a diagram representing a partial pressure of hydrogen and nitrogen in a cell with a total pressure at a hydrogen inlet increased to a fourth pressure in an embodiment of the present invention.

As shown in step S205 in FIG. 10, after increasing the total pressure at the hydrogen inlet to $P_{4T}$, the controller 50 adjusts the voltage of the load such that the output electric current I of the fuel cell 11 becomes $I_3$. The output electric current $I_3$ may be equal to the output electric current at a normal start-up. Alternatively, in consideration that the hydrogen circulation pump 29 is not in operation, the output electric current $I_3$ may be smaller than the output electric current at a normal start-up.

The controller 50 continues the warm-up operation of the fuel cell 11 in this way until the hydrogen flow channel 62 clogged due to freezing is defrosted because of lost heat of the fuel cell 11. As shown in step S206 in FIG. 10, the controller 50 obtains the temperature of the fuel cell 11 by a temperature sensor 37. Then, as shown in step S207 in FIG. 10, the controller 50 compares the obtained temperature with a clog avoiding temperature, such as about 30° C. When the obtained temperature of the fuel cell 11 is higher than the clog avoiding temperature, the controller 50 determines that the clog of the hydrogen flow channel 62 is removed. Then, as shown in step S208 in FIG. 10, the controller 50 decreases the total pressure at the hydrogen inlet to $P_{5T}$ which equals to the pressure at a normal start-up. Then, as shown in step S209 in FIG. 10, the controller 50 starts a motor 30 of the hydrogen circulation pump 29 to start the hydrogen circulation pump 29.

When the hydrogen circulation pump 29 is started, because the clog of the hydrogen flow channel 62 has been removed as described above by referring to FIG. 8, substantially the same amount of hydrogen and nitrogen flows into each of the hydrogen flow channels 61 to 64 enabling a stable operation of the fuel cell 11. Then, as shown in step S210 in FIG. 10, the controller 50 lowers the voltage of a load 32 to increase an output electric current from the fuel cell 11 in order to further continue the warm-up operation of the fuel cell 11.

In the present reference example, when a clog of a hydrogen flow channel is expected at a start-up below the freezing point, the warm-up operation of the fuel cell 11 is performed with the total pressure at the hydrogen inlet of the fuel cell 11 higher than the total pressure at the hydrogen inlet in a normal start-up of the fuel cell 11 and without running the hydrogen circulation pump 29. In this way, the present reference example achieves an advantage that the likelihood of the cell 10 to have a negative voltage during the warm-up operation due to a shortage of hydrogen can be suppressed by increasing, in advance, the hydrogen partial pressure of the hydrogen flow channel clogged due to freezing. Further, as shown in FIG. 12, when freezing occurs, ice grains 75 may attach to the surface of a diffusion layer 73 which is next to the hydrogen flow channel 74 or ice particles 76 which are minute formations of ice may be generated inside the diffusion layer 73. With such increased resistance against the hydrogen in the hydrogen flow channel 74 from reaching to a catalyst 72 and electrolyte membrane 71, degradation of the catalyst 72 may occur due to a lack of sufficient supply of hydrogen to the catalyst 72. In the present reference example, by controlling the total pressure at the hydrogen inlet at a start-up below the freezing point to be higher than the total pressure at a normal start-up, the hydrogen partial pressure inside the hydrogen flow channel 74 is increased to facilitate hydrogen to reach the catalyst 72 and electrolyte membrane 71. In this way, an occurrence of negative voltage and degradation of fuel cell 11 due to a shortage of hydrogen gas at a start-up below the freezing point can be effectively suppressed.

It should be noted that in the present reference example, the descriptions are made by assuming that the hydrogen circulation pump 29 is not running at the start-up of the fuel cell, the hydrogen circulation pump 29 may be started when starting-up the fuel cell 11.

The invention claimed is:

1. A fuel cell system comprising:
   a fuel cell that includes a plurality of stacked cells for generating power by an electrochemical reaction between fuel gas and oxidant gas;
   a pressure adjusting valve that is disposed between a fuel tank and a fuel gas inlet of the fuel cell for adjusting a gas pressure at the fuel gas inlet;
   a gas circulation pump that circulates reacted fuel gas from a fuel gas outlet of the fuel cell to the fuel gas inlet;
   a cell voltage acquisition unit that acquires a voltage of each of the cells; and
   a controller programmed to perform a start-up and a stop of the gas circulation pump and adjusts an open degree of the pressure adjusting valve,
   wherein the controller comprises:
   a clog determination unit that, at a start of the fuel cell,
      introduces the fuel gas into the fuel gas inlet while adjusting the open degree of the pressure adjusting valve to control the gas pressure at the fuel gas inlet to be a first pressure,
      starts the fuel gas circulation pump, and
      determines that a clog is present in a fuel gas flow channel inside the fuel cell when at least one voltage of each of the cells acquired by the cell voltage acquisition unit is lower than a predetermined voltage; and
   a clog elimination unit that removes the clog of the fuel gas flow channel when the clog determination unit has determined that the clog is present in the fuel gas flow channel, by
      adjusting the open degree of the pressure adjusting valve,
      introducing the fuel gas into the fuel gas inlet to control the gas pressure at the fuel gas inlet to be a second pressure which is higher than the first pressure, and
      stopping the fuel gas circulation pump.

2. The fuel cell system according to claim 1, wherein
   after lowering an output electric current of the fuel cell until a negative voltage of each of the cells is removed, the clog elimination unit increases the output electric current to a predetermined electric current.

3. The fuel cell system according to claim 2, wherein
   the fuel cell system further comprises a cell electric current density distribution acquisition unit that senses an electric current density distribution of each of the cells, and
   the clog determination unit determines that the clog is present in the fuel gas flow channel when the electric current density distribution of each of the cells acquired by the cell electric current density distribution acquisition unit shows an unbalance more than a threshold.

4. The fuel cell system according to claim 3, wherein
   the cell electric current density distribution acquisition unit is a pair of partial electric current sensor strips, each disposed at a fuel gas upstream side and a fuel gas downstream side of each of the cells, and
   it is determined that the clog is present when a difference between an electric current density sensed by the partial electric current sensor strip disposed at the fuel gas upstream side of each pair of the partial electric current sensor strips and an electric current density sensed by the partial electric current sensor strip disposed at the fuel gas downstream side is more than a threshold.

* * * * *